United States Patent

[11] 3,625,448

| [72] | Inventor | Rodney J. L. Griffiths<br>4375 Avalon Street, Pierrefonds, Quebec, Canada |
|---|---|---|
| [21] | Appl. No. | 819,566 |
| [22] | Filed | Apr. 28, 1969 |
| [45] | Patented | Dec. 7, 1971 |

[54] SCRAP TAKEUP
9 Claims, 5 Drawing Figs.

[52] U.S. Cl. .................................................. 242/78,
242/25 R, 242/117
[51] Int. Cl. ..................................................... B21c 47/04,
B65h 75/28
[50] Field of Search ........................................ 242/25, 78,
100.1, 107.1, 18 PW, 18 EW, 107.13, 86.1, 117

[56] References Cited
UNITED STATES PATENTS
2,341,369  2/1944  Fornwald, Jr. ............... 242/25

3,011,730  12/1961  Martino ....................... 242/25
507,019  10/1893  Lucia ......................... 242/86.1
FOREIGN PATENTS
1,174,798  10/1958  France ........................ 242/25

Primary Examiner—George F. Mautz
Assistant Examiner—Gregory A. Walters
Attorney—Smart & Biggar ABSTRACT: Means for coiling cable and automatically separating defective cable at the leading end from the good remainder, comprising a rotatable main cable takeup reel and a rotatable auxiliary cable takeup reel coaxial therewith. Guide means permits the free passage of cable from the main to the auxiliary reel until good cable reaches the auxiliary reel, whereupon the two reels are rotated and the guide means entrains the cable so that good cable is wound on the main takeup reel and defective cable is simultaneously wound on the auxiliary takeup reel.

PATENTED DEC 7 1971 3,625,448

INVENTOR
RODNEY J. L. GRIFFITHS
BY Smart & Biggar
ATTORNEYS.

SCRAP TAKEUP

BACKGROUND OF THE INVENTION

This application relates to cable coiling apparatus and, more particularly, apparatus for separating imperfect or scrap cable at the leading end of processed cable being coiled from good cable which comprises the remainder of the cable being coiled.

The expression "cable" when used throughout this specification includes single- or multiple-stranded wire structures, with or without an insulating or protective jacket or sheath, and particularly includes cable useful as an electrical conductor.

This invention is particularly useful in conjunction with processing operations where, for example, cable is being covered with an extruded plastic jacket or with a metal sheath which is wrapped therearound and seam welded, although it will be apparent that the invention has utility in other applications. Processes such as those just mentioned are continuous in the sense that, once the cable is started through processing apparatus, such as a plastic extruder or seam welder, the extrusion or seam welding must continue without interruption in order to maintain the quality of the jacket or sheath at a consistent level and to avoid imperfection. Further, because of the high unit cost per lineal foot of cable, the operator of the processing apparatus must achieve normal running conditions within as short a time as possible after the cable first emerges from the processing apparatus in order to keep the initial length of cable, which is normally imperfect and consequently must be scrapped, to an absolute minimum. While some variation in the speed at which the cable is processed through such apparatus is permissible without substantially affecting the quality of the extruded jacket or seam-welded sheath, economy demands minimum delay in reaching the optimum operating speed.

Cable which is subjected to processing such as that mentioned in the preceding paragraph is withdrawn from a give-up reel prior to its passage through the processing apparatus and is ultimately coiled on a takeup reel after being subjected to the processing, usually passing through some intermediate step, such as cooling, after processing and prior to being wound on the takeup reel. As the initial length of cable, for example the first 30 feet, is normally imperfect owing to the fact that it takes some finite period of time for the processing apparatus to reach optimum running speed, it has been the practice of the operator of the processing apparatus to place a mark on the cable where the transition from imperfect or defective cable to good cable occurs. The operator of the takeup apparatus then waits until this mark reaches his station whereupon he cuts off the imperfect leading end of the cable and secures the end of the good cable to a takeup reel with rotation of the takeup reel then being initiated in order to wind the good cable thereon. While the cutting off of the imperfect leading end of the cable and the securing of the end of the good cable to the takeup reel is possible at relatively slow operating speeds (for example, 100 ft. per minute), some cable processing apparatus operates at a much higher optimum operating speed (for example 250 ft. per minute), with the result that the manual method of scrapping the imperfect leading end of the cable is virtually impossible.

Attempts have been made to attack the problem of separating the imperfect leading end of the cable from the good remainder at high operating speeds by providing an auxiliary cable takeup reel upon which the imperfect leading end of the cable is wound, and then transferring the cable to a main takeup reel upon which the good remainder of the cable is wound. Apparatus of this type is disclosed in Fornwald, Jr., U.S. Pat. No. 2,341,369, dated Feb. 8, 1944, and Martino, U.S. Pat. No. 3,011,730, dated Dec. 5, 1961. However, apparatus of this type involves the use of a cable- distributing mechanism or deflecting mechanism whereby the cable may be transferred from the auxiliary cable takeup reel to the main cable takeup reel after the imperfect leading end has been wound on the auxiliary reel. Apparatus of this type is rather complex, costly and subject to maintenance, and indeed, operating problems, with the result that it is not in all respects satisfactory.

SUMMARY OF THE INVENTION

I have found that the separation of the imperfect leading end portion of processed cable from the good remainder may be effected efficiently at high operating speeds without the drawbacks of the prior art apparatus by providing, in cable coiling apparatus, a rotatable main cable takeup reel adapted to receive a main cable portion of a cable upon rotation of the main reel, a rotatable auxiliary cable takeup reel adjacent thereto and coaxial therewith, means for securing cable to the auxiliary reel, and guide means permitting the free passage or cable from the main reel to the auxiliary reel and entraining the cable upon rotation of the reels which portions of the cable are simultaneously coiled on the main and auxiliary reels. Such apparatus permits imperfect cable to pass freely over the main cable takeup reel onto the auxiliary cable takeup reel until such time as the transition between imperfect cable and good cable is reached. At this point, rotation of the main and auxiliary cable takeup reels is initiated, the imperfect cable being wound upon the auxiliary reel while the good cable is wound on the main reel.

BRIEF DESCRIPTION OF THE DRAWING

In drawings which illustrate an embodiment of the invention.

DESCRIPTION OF THE PREFERRED EMBODIMENTS

Figure 1:
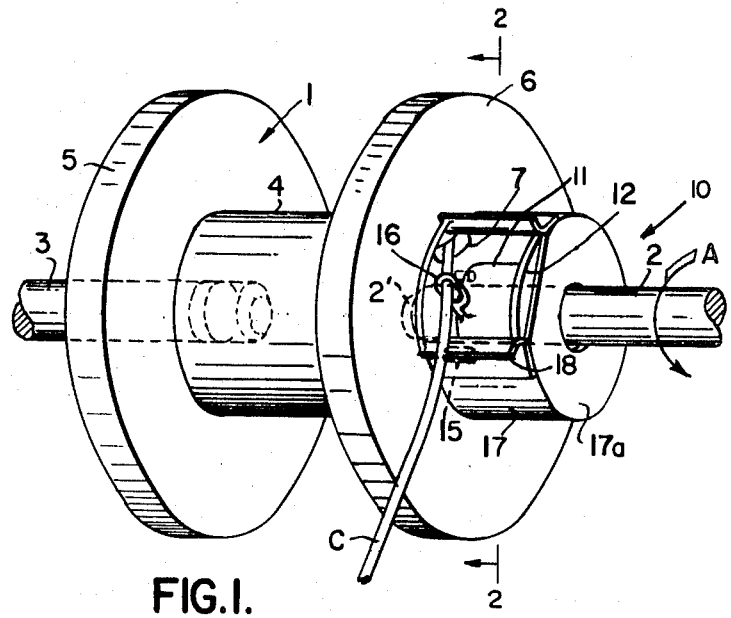
FIG. 1, is a schematic, pictorial representation of a main cable takeup reel and an auxiliary cable takeup reel in accordance with the invention.

Referring now to the drawings, a main cable takeup reel is designated generally at 1 and an auxiliary cable takeup reel is designated generally at 10. The auxiliary cable takeup reel 10 is mounted on a drive shaft 2 which extends therethrough, projecting beyond the other side to provide a stub shaft 2′ upon which one end of the main takeup reel 1 is mounted. The other end of the main takeup reel 1 is mounted on a stub shaft 3 with the main reel comprising an axial drum 4 and two end flanges 5 and 6. In the end flange 6 there is provided a generally arcuate slot 7 of size sufficient to loosely receive a cable C to be coiled.

Apart from the mounting of the auxiliary reel 10 on the drive shaft 2, the means for mounting and driving the main takeup reel 1 is conventional with apparatus of this nature and is therefore not depicted nor described in this application.

The auxiliary cable takeup reel 10 is provided with an axial drum 11 and an end flange 12, no end flange being provided on the end of the auxiliary takeup reel adjacent the main takeup reel. The drum 11 of the auxiliary takeup reel is mounted on a hub 13 through spokes 14, the hub being secured to the drive shaft 2 for rotation therewith. On one of the spokes 14 is provided a projecting drive pin 15 which is received in a corresponding bore (not shown) in end flange 6 of main reel 1 so that the main reel is in driving connection with the auxiliary reel and, through the auxiliary reel, with drive shaft 2.

Projecting generally radially from the outer peripheral surface of the drum 11 is an eye 16 adapted to loosely receive cable C when threaded therethrough. A major arc of the outer peripheral surface of the auxiliary reel 10 is encased in an arcuate guard or shield 17 which is provided with a reinforced lip 18 the purpose of which will be described hereafter. The guard is stationary and preferably subtends an angle of about 270°. If desired, the end of the auxiliary reel remote from the main reel may be covered with an end cover or flange 17a forming part of the guard 17.

When the main reel 1 is mounted on stub shafts 2' and 3 with drive pin 15 inserted into the associated bore in the end flange 6, the relationship between slot 7, eye 16 and reinforced lip 18 is substantially as illustrated in FIG. 1 of the drawings. In other words, a cable passing through slots 7 and eye 16 will extend over lip 18 when viewed in the direction of rotation of the auxiliary reel as represented by the arrow A in FIG. 1.

Figure 2A:
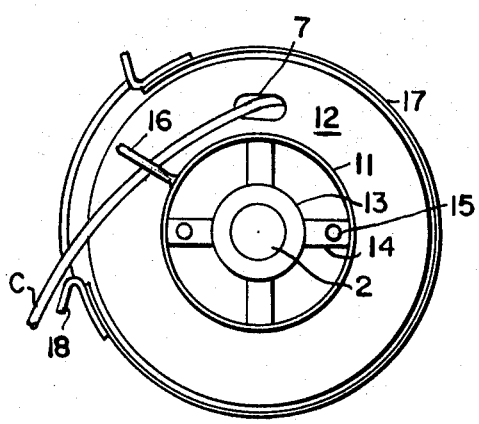
FIGS. 2a, 2b, 2c and 2d are sections taken along the line 2—2 of FIG. 1 sequentially illustrating the winding of the imperfect leading end of the cable on the auxiliary cable takeup
Figure 2B:
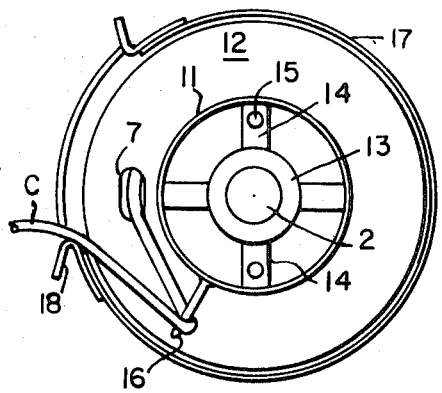
Figure 2C:
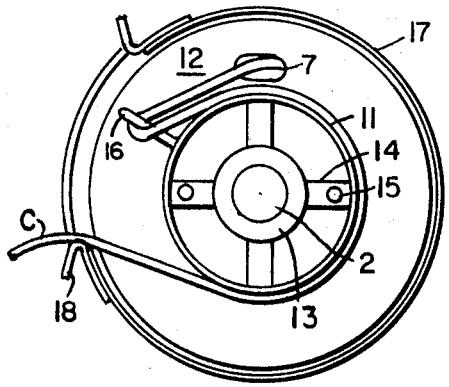
Figure 2D:
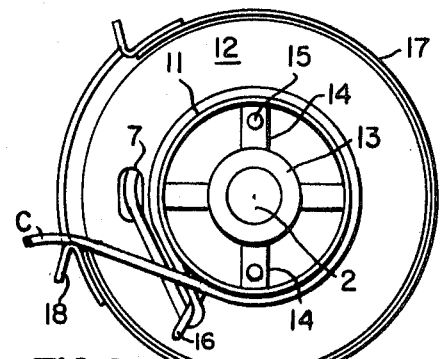

In operation, the main reel 1 is mounted for rotation on stub shafts 2' and 3 as illustrated in FIG. 1 and the slot 7, eye 16 and reinforced lip 18 are in the relative positions illustrated in that figure. As the leading end of cable C reaches the takeup reel from the cable processing apparatus, the takeup operator manually threads the end over reel 1 through slot 7, through eye 16 and over the lip 18. The cable is then permitted to advance freely along this path until such time as a mark made by the operator of the cable processing apparatus, to denote the transition from imperfect to good cable, passes through slot 7. At this point the imperfect leading end of the cable is on the auxiliary reel side of main reel and flange 6 whereas the good cable is on the main reel side of end flange 6, and the operator then starts the takeup drive which results in rotation of auxiliary reel 10 and, through drive pin 15, the main reel 1. As the reels rotate in the direction illustrated by arrow A the eye 16 assumes the position illustrated in FIG. 2a and the imperfect cable impinges on lip 18 thus bending the cable back upon itself and about eye 16 to secure the cable to the auxiliary reel 10. Simultaneously, the good cable commences to coil about drum 4 of main reel 1. As rotation continues, the scrap cable assumes the positions illustrated in FIGS. 2b, 2c and 2d as it commences to be coiled upon drum 11 of auxiliary reel 10.

As the length of the imperfect leading end of the cable is relatively short when compared with the length of good cable, the imperfect cable will be completely wound on drum 11 and auxiliary reel 10 shortly after the good cable commences to be coiled about drum 4 of main cable 1. However, rotation of the two reels continues until such time as all of the good cable is coiled on main reel 1 at which point the takeup operator stops rotation of the two reels. The cable is then cut at the point where it passes through slot 7 on the auxiliary reel side of end flange 6, and the main reel may be removed from the takeup apparatus in the conventional manner, the imperfect cable having been effectively separated from the good cable coiled upon the main takeup reel. When the main takeup reel has been removed, the imperfect cable may simply be slipped off the open end of the auxiliary reel by disengaging the cut end from eye 16 and passing the coiled scrap cable over eye 16.

It will be apparent from the foregoing that the cable, in addition to being flexible enough to bend and coil, should also be relatively stiff if the above described means for securing the cable to the auxiliary reel is utilized. Of course it is possible to use other securing means, such as a manually operable clamp, although the means described in detail above is preferable because it automatically effects a connection between the cable and the auxiliary reel when the reel is rotated.

It will be appreciated that many variations in the specific form of the apparatus described above are possible without departing from the scope of the invention. For example slot 17 could be in the form of a radial slot extending to the periphery of the end flange 6, on an eye or hook radially projecting from the peripheral surface of end flange 6. It is only necessary that it serve the dual purpose of guiding cable from the main reel to the auxiliary reel and entraining the cable upon rotation of the main reel to ensure that cable is coiled on the main reel. Similarly, guard 17–17a is optional provided a cable-impinging member such as reinforced lip 18 is provided to ensure the cable is secured to the auxiliary reel when it is rotated.

What I claim as my invention is:

1. In cable-coiling apparatus, a rotatable main cable takeup reel adapted to receive a main cable portion of a cable upon rotation of said main reel, a rotatable auxiliary cable takeup reel adjacent to and coaxial with said main reel adapted to receive an end portion of said cable, a confined path from said main reel to said auxiliary reel for permitting free passage of said cable from said main reel to said auxiliary reel, a cable receiving loop on said auxiliary reel of size sufficient to permit the free passage of cable therethrough for securing said cable to said auxiliary reel between said main cable portion and said end portion, and a cable impinging member adapted to bend the cable about said loop whereby the end portion of said cable and the main portion of said cable are simultaneously coiled on said auxiliary and main reels respectively upon rotation of said reels.

2. Apparatus as claimed in claim 1, wherein when said takeup reels are stationary in cable coiling position, the confined path, the loop and the cable impinging member are so aligned as to permit the cable to pass freely through the confined path, through the loop and over the cable impinging member when said member is viewed in the direction of rotation of the reels.

3. Apparatus as claimed in claim 2, wherein a major arc of the peripheral surface of the auxiliary reel is covered by a stationary arcuate shield, one end edge of which forms said cable impinging member.

4. In cable-coiling apparatus a rotatable auxiliary cable takeup reel, a main cable takeup reel, adjacent the auxiliary reel and coaxial and rotatable therewith, an end flange on at least one of the adjacent ends of the main and auxiliary reels, aperture means through the at least one end flange to accommodate the free passage of cable from the main reel to the auxiliary reel, and cable-retaining means adapted to secure the cable to the auxiliary reel at a location intermediate its ends upon rotation of said reels whereby portions of the cable are simultaneously coiled on the main and auxiliary reels.

5. Apparatus as claimed in claim 4, wherein said cable-retaining means comprises a closed loop secured to the auxiliary reel and of internal size sufficient to permit the cable to pass freely therethrough, and a stationary cable impinging member substantially parallel with the axis of rotation of the auxiliary reel and spaced from the peripheral surface thereof whereby to cause the cable to bend back upon itself about the loop upon rotation of the auxiliary reel.

6. Apparatus as claimed in claim 5, wherein, when said cable-coiling apparatus is stationary for receipt of cable to be coiled, the aperture means, the loop and the cable impinging member are so aligned that the cable passes through the aperture, through the loop, and over the cable-impinging member when said member is viewed in the direction of rotation of the auxiliary reel.

7. Apparatus as claimed in claim 6, wherein the major arc of the peripheral surface of the auxiliary reel is encased in a stationary guard, one end edge of which forms said stationary cable-impinging member.

8. Apparatus as claimed in claim 7, wherein said major arc subtends an angle of about 270°.

9. Apparatus as claimed in claim 4, wherein said main reel is provided with two end flanges and said auxiliary reel is open at the end adjacent the main reel and provided with an end flange at the end remote from the main reel.

* * * * *